（12）United States Patent
Giroux et al.

(10) Patent No.: US 11,851,945 B2
(45) Date of Patent: Dec. 26, 2023

(54) BUG SCREEN

(71) Applicant: Lippert Components, Inc., Elkhart, IN (US)

(72) Inventors: Éric Giroux, Granby (CA); Adrien Beaudoin, Farnham (CA)

(73) Assignee: LIPPERT COMPONENTS, INC., Elkhart, IN (US)

(*) Notice: Subject to any disclaimer, the term of this patent is extended or adjusted under 35 U.S.C. 154(b) by 0 days.

(21) Appl. No.: 17/578,790

(22) Filed: Jan. 19, 2022

(65) Prior Publication Data
US 2022/0228435 A1   Jul. 21, 2022

Related U.S. Application Data

(60) Provisional application No. 63/138,957, filed on Jan. 19, 2021.

(51) Int. Cl.
*E06B 9/52* (2006.01)
*E06B 9/01* (2006.01)
*B60J 1/20* (2006.01)

(52) U.S. Cl.
CPC ............... *E06B 9/52* (2013.01); *B60J 1/2011* (2013.01); *E06B 2009/015* (2013.01); *E06B 2009/527* (2013.01)

(58) Field of Classification Search
CPC ................. E06B 9/52; E06B 2009/527; E06B 2009/015; B60J 1/2011
USPC .................................................. 160/404, 380
See application file for complete search history.

(56) References Cited

U.S. PATENT DOCUMENTS

| 1,379,001 | A | | 5/1921 | Diven | |
|---|---|---|---|---|---|
| 1,464,370 | A | * | 8/1923 | Novick | ...................... E06B 9/52 160/374 |
| 1,930,138 | A | * | 10/1933 | Van Derhoef | ...... F16K 17/1626 220/89.4 |
| 2,567,743 | A | * | 9/1951 | Stafford | ...................... E06B 9/52 211/45 |

(Continued)

FOREIGN PATENT DOCUMENTS

| DE | 93 09 968 | 10/1993 |
|---|---|---|
| ES | 152315 | 10/1970 |

(Continued)

OTHER PUBLICATIONS

International Search Report dated May 12, 2022 issued in PCT International Patent Application No. PCT/US2022/012945, 5 pp.

*Primary Examiner* — Brent W Herring
(74) *Attorney, Agent, or Firm* — NIXON & VANDERHYE P.C.

(57) ABSTRACT

A bug screen frame assembly includes a front frame portion defining an exterior of the bug screen frame assembly, a rear frame portion received by the front frame portion, and a mesh screen captured between the front frame portion and the rear frame portion. One of the front frame portion and the rear frame portion includes a plurality of spikes extending toward the other of the front frame portion and the rear frame portion, and the other of the front frame portion and the rear frame portion comprises a groove that receives the spikes. The spikes extend through the mesh screen to retain the mesh screen. The overall assembly has a clean appearance with a self-tensioning screen without any visible clamps or screws.

14 Claims, 6 Drawing Sheets

(56) References Cited

U.S. PATENT DOCUMENTS

| | | | | |
|---|---|---|---|---|
| 2,568,139 A * | 9/1951 | Behnke | ............... | E06B 9/52 160/404 |
| 2,709,489 A * | 5/1955 | Keebler | ............... | E06B 9/52 160/381 |
| 3,960,197 A | 6/1976 | Daniels | | |
| 4,330,022 A * | 5/1982 | Bull | ............... | E06B 7/28 160/379 |
| 5,086,604 A * | 2/1992 | Orth | ............... | E06B 3/28 52/745.16 |
| 5,143,138 A * | 9/1992 | Zwart | ............... | E06B 9/521 160/369 |
| 5,301,737 A * | 4/1994 | Martin | ............... | E06B 9/52 160/395 |
| 6,032,433 A * | 3/2000 | Hatziathanasiou | ... | E04H 15/646 52/63 |
| 6,044,892 A | 4/2000 | Epstein | | |
| 6,073,675 A | 6/2000 | Dannaher | | |
| 6,125,910 A * | 10/2000 | Pepperell | ............... | E06B 9/01 160/381 |
| 6,263,949 B1 * | 7/2001 | Guthrie, Jr. | ............... | E06B 9/02 160/371 |
| 6,378,944 B1 * | 4/2002 | Weisser | ............... | A47C 7/40 160/369 |
| 6,581,668 B1 * | 6/2003 | Oakley | ............... | E06B 9/52 160/180 |
| 2004/0226208 A1 | 11/2004 | Kownacki et al. | | |
| 2015/0267459 A1 * | 9/2015 | Sprague | ............... | E06B 9/24 160/378 |
| 2017/0128869 A1 * | 5/2017 | Simmons | ............... | F16B 1/00 |
| 2019/0211620 A1 * | 7/2019 | Hay, III | ............... | E06B 9/52 |

FOREIGN PATENT DOCUMENTS

| | | |
|---|---|---|
| JP | S49-106126 U | 9/1974 |
| WO | WO 2011/152736 | 12/2011 |
| WO | WO 2017/015696 | 2/2017 |

\* cited by examiner

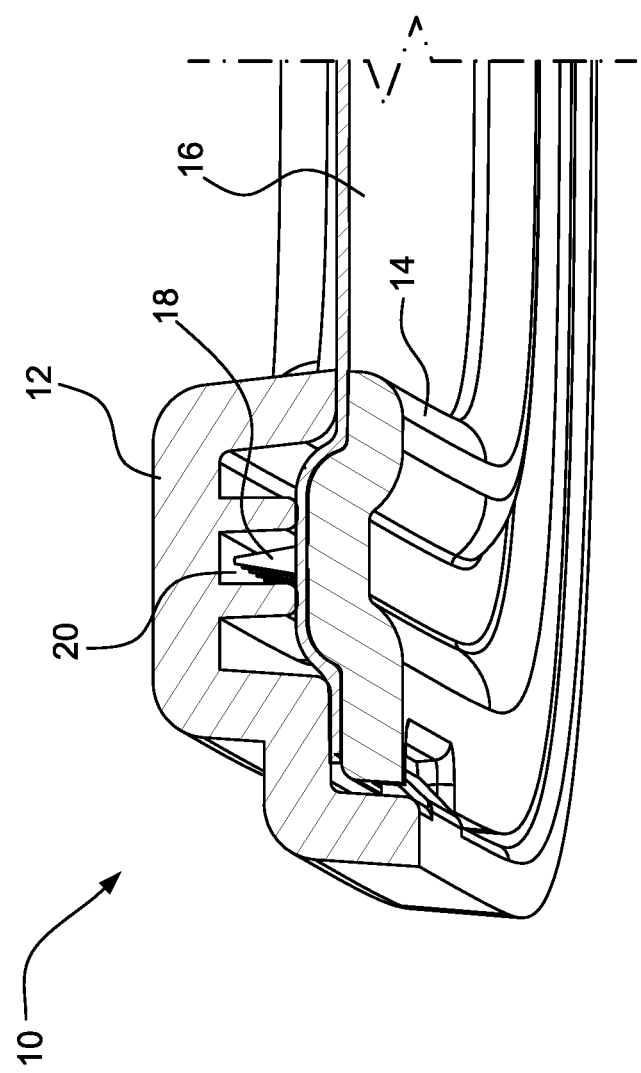

BUG SCREEN

CROSS-REFERENCES TO RELATED APPLICATIONS

This application claims the benefit of U.S. Provisional Patent Application No. 63/138,957, filed Jan. 19, 2021, the entire content of which is herein incorporated by reference.

STATEMENT REGARDING FEDERALLY SPONSORED RESEARCH OR DEVELOPMENT (NOT APPLICABLE)

BACKGROUND

The invention relates to a bug screen frame assembly and, more particularly, to a bug screen frame assembly with mesh that is captured and self-tensioned without any clamps or screws.

In typical bug screens, the frame may be made of aluminum, plastic, or a combination of both materials. A mesh screen portion is usually installed by one of a few common installation methods. The screen may be retained in a hollow portion or channel of the frame by the insertion of cord or spline into the hollow portion of the frame. A mesh screen may also be integrated into a frame by process of overmolding, or making an injection molded frame that integrates the screen before hardening. These methods are used to help ensure that the mesh is installed around the periphery of the frame, but they can cause imperfect alignment of the screen that creates gaps, holes, or slack between the mesh and frame.

SUMMARY

The bug screen frame assembly of the described embodiments includes a mesh screen that is received between male and female frame pieces designed to fit together with spikes protruding inwardly from a rear male frame portion to self-tension a mesh screen. The spikes assist in positioning and retaining the mesh screen in a non-straining way and the rear male frame portion is received within and secured to the front female frame portion so that the mesh screen is tensioned and captured by the plastic frame pieces. The assembly may be suitable for integration with a side cab window for a semi-truck.

The rear male frame portion may include a ring of spikes positioned to fit within a recessed groove in the front female frame portion. For installation, a loose mesh sheet is placed over the interior face of the front female frame portion with the groove, and the spikes of the rear male frame portion are pierced through the mesh. As the spikes pierce the mesh sheet, the mesh sheet naturally shifts and aligns with the spikes to avoid folds or gaps as it is retained. Finally, the rear male frame portion fits into the front female frame portion and is secured therein to self-tension and capture the mesh screen without additional modification. The rear male frame portion may snap into the front female frame portion to engage the exterior face of the rear frame portion in a snap-fit relationship to self-tension and capture the mesh screen without additional components or modification. The final product is a lightweight and thin product with a seamless bug screen.

In an exemplary embodiment, a bug screen frame assembly includes a front frame portion defining an exterior of the frame assembly, a rear frame portion connected to the front frame portion, and a mesh screen captured between the front frame portion and the rear frame portion. One of the front frame portion and the rear frame portion includes a plurality of spikes extending toward the other of the front frame portion and the rear frame portion, and the other of the front frame portion and the rear frame portion includes a groove that receives the spikes. The spikes extend through the mesh screen.

The front frame portion and the rear frame portion may be connected in a snap fit that tensions the mesh screen.

The front frame portion and the rear frame portion may be connected and secured in a fitting relationship that tensions the mesh screen. The front frame portion may be a female piece, and the rear frame portion may be a male piece in relation to the fitting relationship.

The spikes may be conical with pointed ends facing the other of the front frame portion and the rear frame portion. The front frame portion and the rear frame portion may be plastic. In some embodiments, the front frame portion and the rear frame portion may be single-piece molded components. In other embodiments, the front frame portion and rear frame portion may be a composite material, formable metal such as aluminum, or any combination thereof.

The other of the front frame portion and the rear frame portion may include three grooves, where the groove that receives the spikes may be a middle groove.

The one of the front frame portion and the rear frame portion may include a bump-out section, where the spikes extend from the bump-out section. In this context, the bump-out section may include inside and outside riser surfaces on respective opposite sides thereof, where the inside riser surface defines a first pinch surface, the other of the front frame portion and the rear frame portion includes a second pinch surface, and the mesh screen may be captured between the first and second pinch surfaces.

In another exemplary embodiment, a bug screen frame assembly includes a front frame portion defining an exterior of the bug screen frame assembly, and a rear frame portion connected to the front frame portion. One of the front frame portion and the rear frame portion is a female frame portion with a circumferential channel, and the other of the front frame portion and the rear frame portion is a male frame portion that engages and is securable to the circumferential channel. A mesh screen is captured within the circumferential channel between the front frame portion and the rear frame portion such that the mesh screen is tensioned.

In yet another exemplary embodiment, a method of assembling a bug screen frame includes the steps of (a) placing the mesh screen over a side of the front frame portion with the groove; (b) positioning the rear frame portion over the mesh screen and the front frame portion and piercing the mesh screen with the spikes such that the spikes extend into the groove; and (c) inserting the rear frame portion to fit within and secure to the front frame portion. The front frame portion may include a circumferential channel, and the method may include a step of fitting and securing the rear frame portion to the circumferential channel. Steps (b) and (c) may be practiced to capture and tension the mesh screen between the front portion and the rear portion

BRIEF DESCRIPTION OF THE DRAWINGS

These and other aspects and advantages will be described in detail with reference to the accompanying drawings, in which:

FIGS. 4-6 are cross-sectional views through the frame assembly.

DETAILED DESCRIPTION

Figure 1:
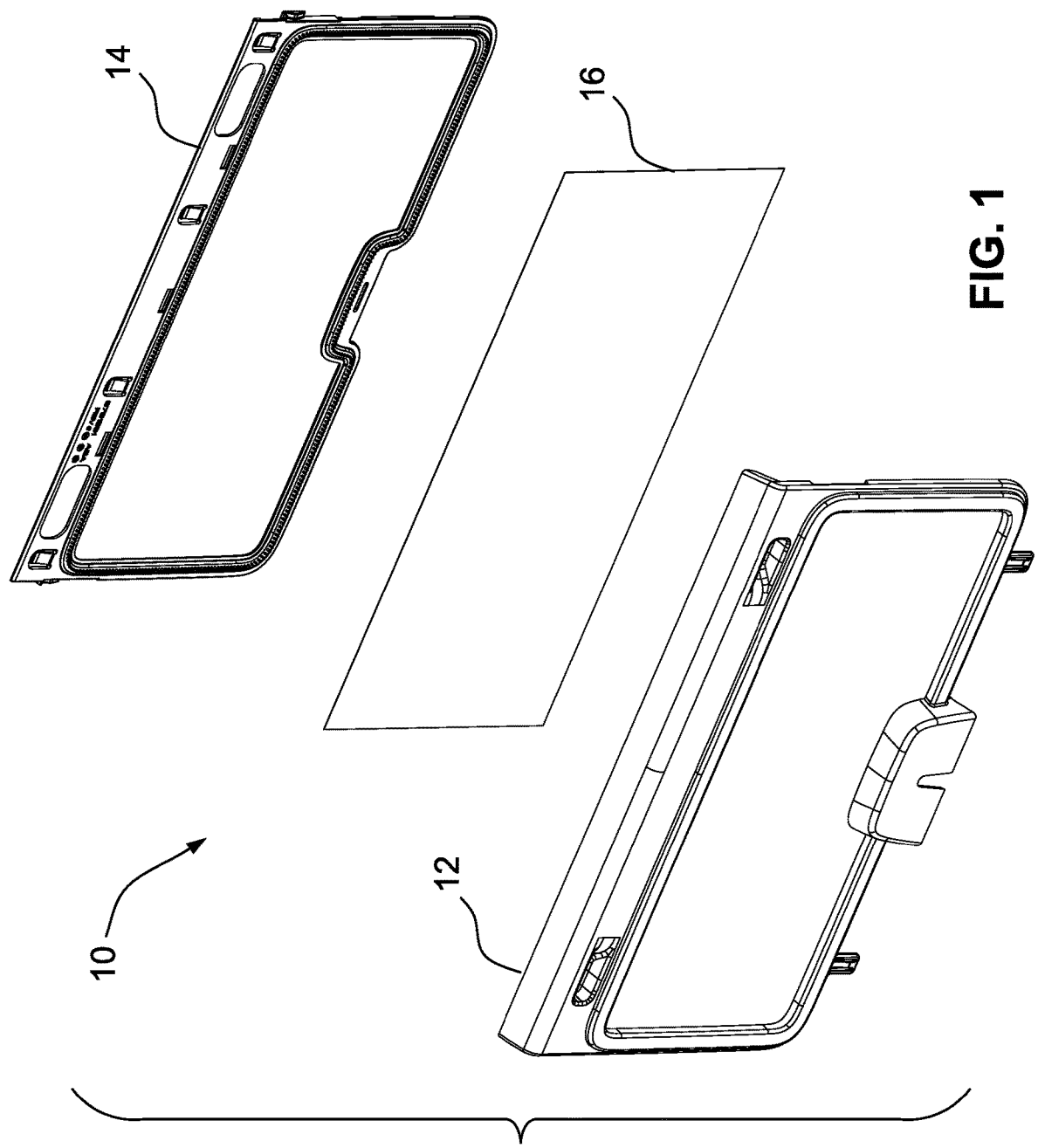
FIG. 1 is an exploded view of the bug screen frame assembly.
Figure 2:
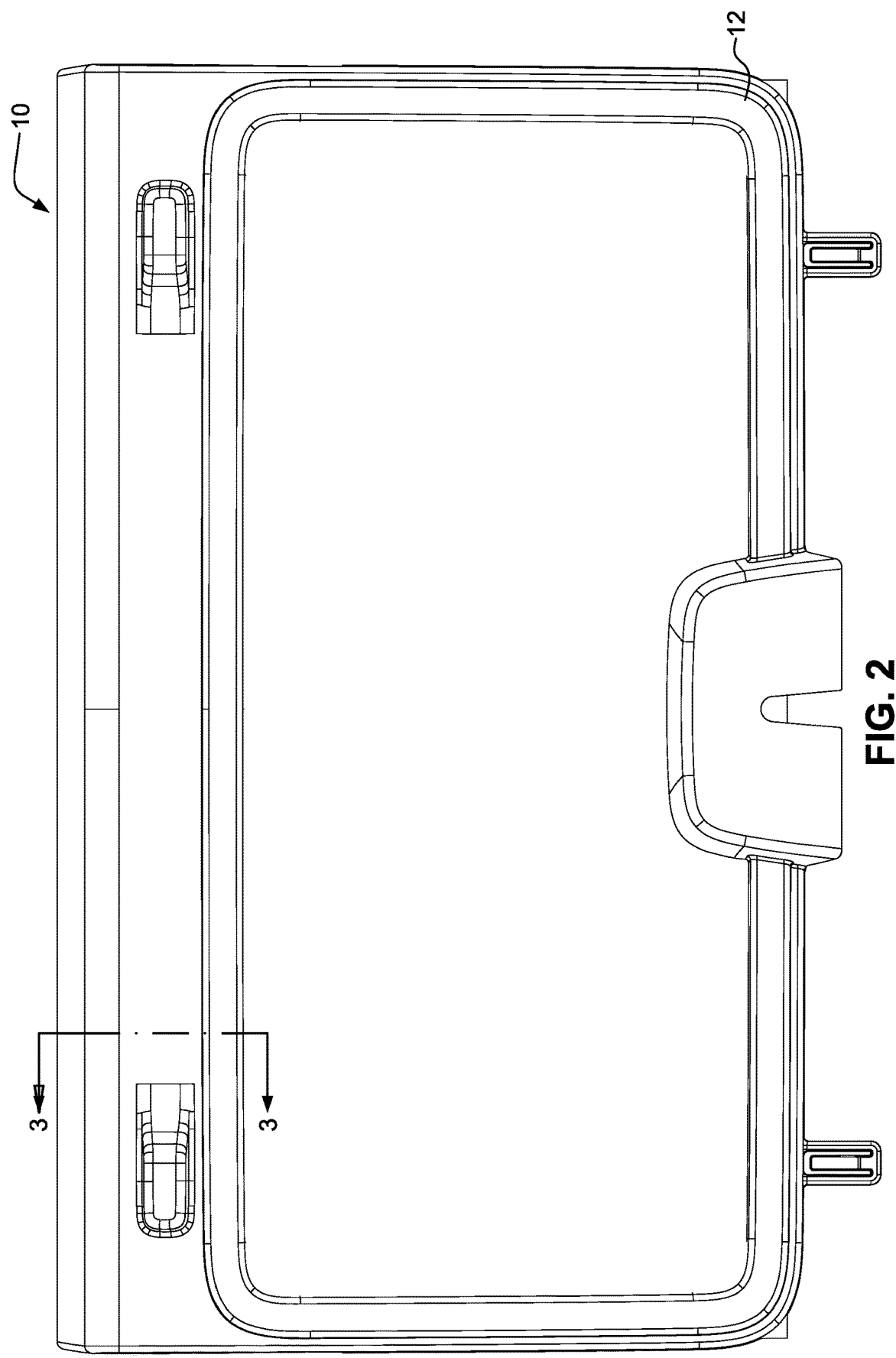
FIG. 2 shows the bug screen frame assembly in an assembled state.
Figure 3:
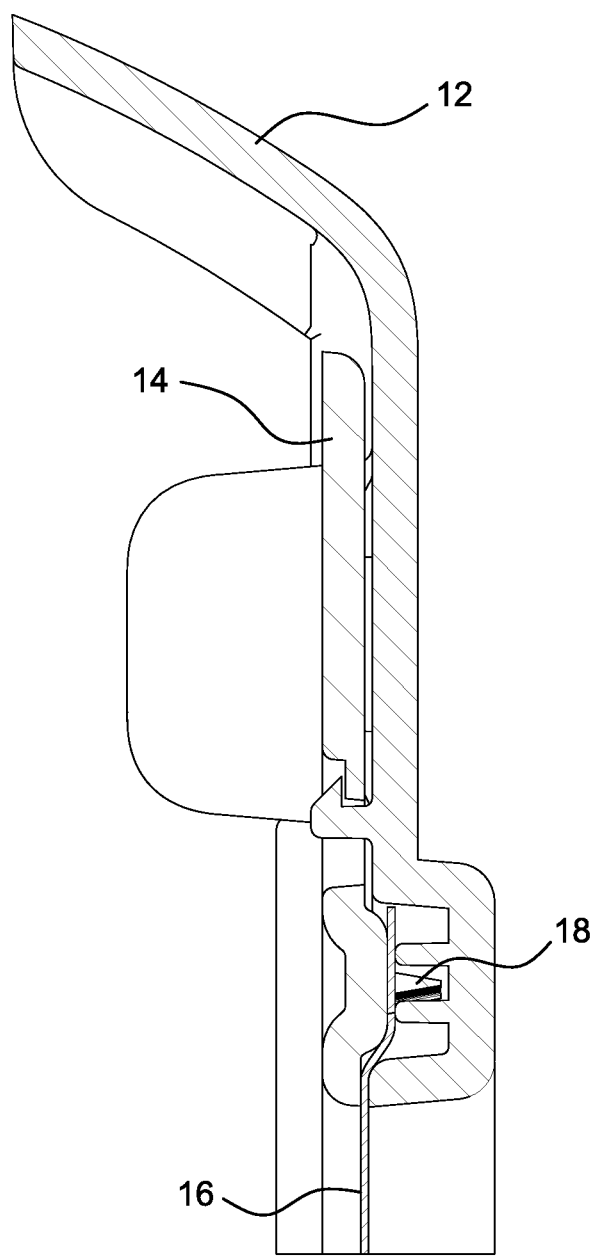
FIG. 3 is a cross-sectional view along line 3-3 in FIG. 2.
Figure 4:
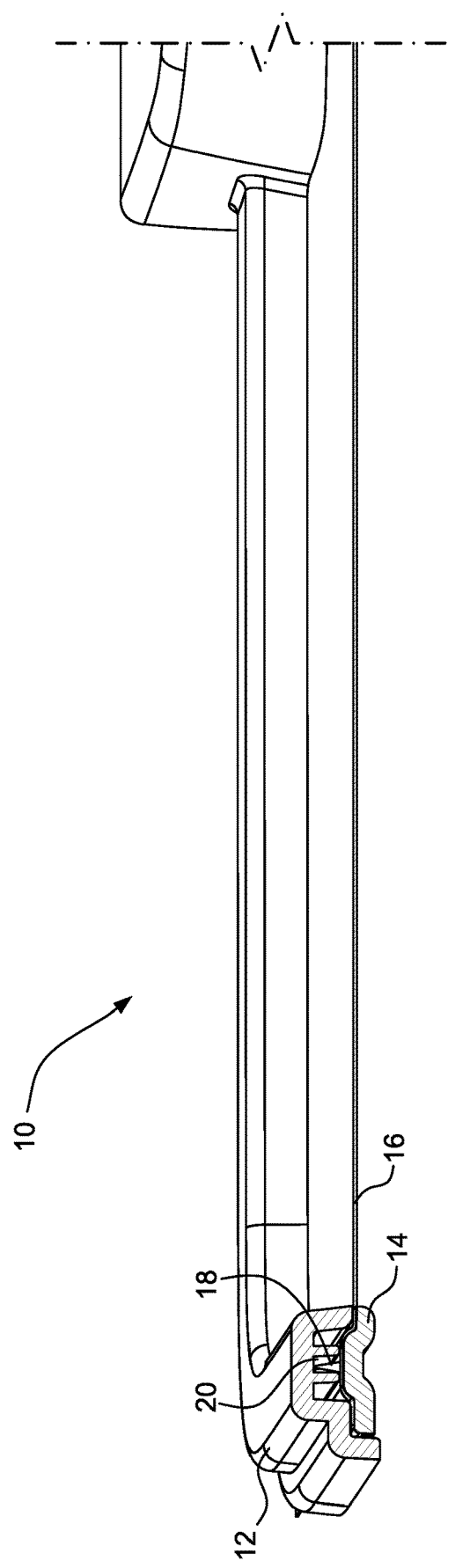

With reference to the drawings, a bug screen frame assembly 10 includes a front frame portion 12 defining an exterior of the bug screen frame assembly 10. A rear frame portion 14 is received within the outer periphery of the front frame portion 12, and a mesh screen 16 is tensioned and captured between the front frame portion 12 and the rear frame portion 14 when the frame portions are secured into engagement.

In the embodiment shown in the drawings, the rear frame portion 14 includes a plurality of spikes 18, and the front frame portion 12 includes at least one groove 20 that receives the spikes 18. The spikes 18 may be spaced from one another around the entire perimeter of the rear frame portion 14. The front frame portion 12 may be provided with multiple grooves 20. In some embodiments, the front frame portion 12 includes three grooves 20, and the middle one of the grooves 20 may receive the spikes 18. The variation shown in the drawings is exemplary, and the bug screen frame assembly 10 could be constructed oppositely with the spikes 18 in the front frame portion 12 and the at least one groove 20 in the rear frame portion 14.

As shown, the spikes 18 may be conical with pointed ends facing the front female portion 12. The spikes 18 are extended to pierce through the mesh screen 16 to position and retain the screen. In some embodiments, the spikes 18 extend from a bump-out section 26 of the rear frame portion 14. The bump-out section 26 includes inside 28 and outside 30 riser surfaces on respective opposite sides thereof. The inside riser surface 28 defines a first pinch surface. The front frame portion 12 includes a corresponding second pinch surface 32 that is shaped in complement with the inside riser surface 28. When the rear frame portion 14 fits into engagement and is secured within the front frame portion 12, the mesh screen 16 is tensioned between the frame pieces and is pulled taut between the first and second pinch surfaces.

In some embodiments, the front frame portion 12 and the rear frame portion 14 are single-piece plastic molded components. In other embodiments, the front frame portion and rear frame portion may be a composite material, formable metal such as aluminum, or any combination thereof.

One of the front frame portion 12 and the rear frame portion 14 may be a female frame portion having a circumferential channel 34. The other of the front frame portion 12 and the rear frame portion 14 may be a male frame portion that fits into and may be secured with the circumferential channel 34 of the female frame portion. In some embodiments, the circumferential channel 34 comprises at least one interior groove 20, and the male frame portion comprises a plurality of spikes 18 extending through the mesh screen and toward the circumferential channel 34, such that distal ends of the spikes 18 are disposed in the interior groove 20. In some embodiments, the rear frame portion 14 may fit into the front frame portion 12 in a snap-fit relationship. In other embodiments, the fitting relationship and securement of the front and rear frame portions may be accomplished by other methods including but not limited to mechanical fasteners, adhesives, riveting, press fitting, or friction welding.

Figure 5:
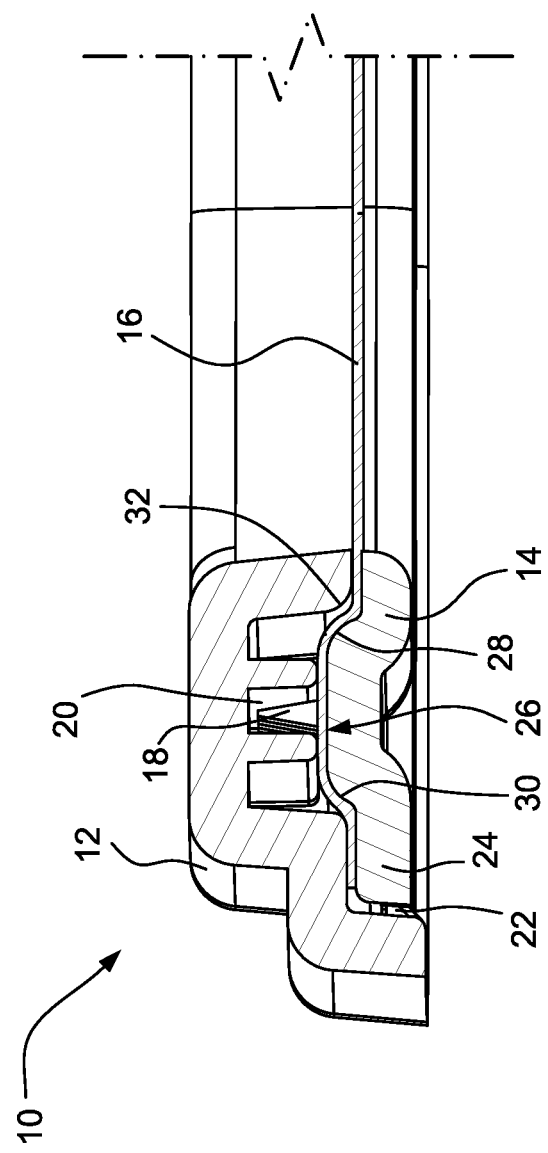

The front frame portion 12 and the rear frame portion 14 may be connected in a snap fit with an outer edge of the outer periphery of the rear frame portion 14 engaging an inner edge of the outer periphery of the front frame portion 12. As shown in FIGS. 5 and 6, the front frame portion 12 may be provided with a plurality of snap ledges 22, and the rear frame portion 14 may be provided with corresponding snap recesses 24. The snap ledges 22 may engage the snap recess 24 to connect the rear frame portion 14 and the front frame portion 12. The rear frame portion 14 may engage the snap ledges 22 to deflect the snap ledges 22 from a rest position outward as the rear frame portion 14 is displaced toward the front frame portion 12 until the snap ledge 22 clears the snap recess 24. Subsequently, the snap ledge 22 returns to its rest position engaging the snap recess 24.

In assembling the bug screen frame, a loose mesh sheet/screen 16 is placed over the inner face of the front female frame portion 12. That is, the mesh sheet 16 is placed over the side of the front female frame portion 12 with the grooves 20. The rear male frame portion 14 is positioned over the mesh screen 16 and the front female frame portion 12 and is advanced into engagement within the front female frame portion 12, thereby piercing the mesh screen 16 with the spikes 18 such that the spikes 18 extend into the groove 20. The rear male frame portion 14 fits within the circumferential channel 34 of the front female frame portion 12 and are secured together.

As the spikes 18 pierce the mesh screen 16, the mesh screen 16 naturally shifts and aligns with the spikes 18 to avoid folds or gaps in the mesh screen 16 as it is retained by the spikes. The fitting relationship between the front female frame portion 12 and the rear male frame portion 14 results in a taut and self-tensioned mesh screen that is captured within the assembly without the need for additional components or modifications. The final product is extremely lightweight and thin defining a seamless bug screen. The overall bug screen frame has a clean appearance with a self-tensioned screen without visible clamps or screws. The bug screen frame assembly may be made as a stand-alone replaceable bug screen frame or it may be integrated with a window frame.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A bug screen frame assembly comprising:
   a front frame portion defining an exterior of the frame assembly;
   a rear frame portion connected to the front frame portion, wherein one of the front frame portion and the rear frame portion is a female frame portion comprising a circumferential channel, and the other of the front frame portion and the rear frame portion is a male frame portion that engages and is securable to the circumferential channel; and
   a mesh screen captured between the front frame portion and the rear frame portion,
   wherein the male frame portion comprises a plurality of spikes extending toward the female frame portion, and the female frame portion comprises the circumferential channel that receives the spikes, and wherein the spikes pierce and extend through the mesh screen, wherein the one of the front frame portion and the rear frame portion comprises a bump-out section with inside and outside riser surfaces on respective opposite sides thereof, and wherein the spikes extend from the bump-out section, the inside riser surface defining a first pinch surface, the other of the front frame portion and the rear frame portion comprising a second pinch surface, and the mesh screen being captured between the first and second pinch surfaces, wherein the circumferential channel comprises at least one interior groove, and wherein the male frame portion comprises the plurality of spikes extending through the mesh screen and toward the circumferential channel, such that distal ends of the spikes are disposed in the interior groove.

2. A bug screen frame assembly according to claim 1, wherein the front frame portion and the rear frame portion are connected in a snap fit that tensions the mesh screen.

3. A bug screen frame assembly according to claim 1, wherein the front frame portion and the rear frame portion are connected and secured in a fitting relationship that tensions the mesh screen.

4. A bug screen frame assembly according to claim 3, wherein the front frame portion is a female piece and the rear frame portion is a male piece in relation to the fitting relationship.

5. A bug screen frame assembly according to claim 1, wherein the spikes are conical with pointed ends facing the other of the front frame portion and the rear frame portion.

6. A bug screen frame assembly according to claim 1, wherein the front frame portion and the rear frame portion are plastic.

7. A bug screen frame assembly according to claim 6, wherein the front frame portion and the rear frame portion are single-piece molded components.

8. A bug screen frame assembly according to claim 1, wherein the other of the front frame portion and the rear frame portion comprises three grooves, and wherein the groove that receives the spikes is a middle groove.

9. A bug screen frame assembly comprising:
a front frame portion defining an exterior of the bug screen frame assembly;
a rear frame portion connected to the front frame portion;
wherein one of the front frame portion and the rear frame portion is a female frame portion comprising a circumferential channel, and the other of the front frame portion and the rear frame portion is a male frame portion that engages and is securable to the circumferential channel; and
a mesh screen captured within the circumferential channel between the front frame portion and the rear frame portion such that the mesh screen is tensioned,
wherein the one of the front frame portion and the rear frame portion comprises a bump-out section with inside and outside riser surfaces on respective opposite sides thereof, the inside riser surface defining a first pinch surface, the other of the front frame portion and the rear frame portion comprising a second pinch surface, and the mesh screen being captured between the first and second pinch surfaces, wherein the bump-out section defines an innermost surface of the one of the front frame portion and the rear frame portion,
wherein the circumferential channel comprises at least one interior groove, and wherein the male frame portion comprises a plurality of spikes extending through the mesh screen and toward the circumferential channel, such that distal ends of the spikes are disposed in the interior groove.

10. A bug screen frame assembly according to claim 9, wherein the front frame portion comprises a snap ledge, and wherein the rear frame portion comprises a snap recess, the snap ledge engaging the snap recess so that the front frame portion receives the rear frame portion.

11. A bug screen frame assembly according to claim 9, wherein the front frame portion and the rear frame portion are plastic.

12. A bug screen frame assembly according to claim 11, wherein the front frame portion and the rear frame portion are single-piece molded components.

13. A method of assembling a bug screen frame having a front frame portion with a circumferential channel, a rear frame portion with a plurality of spikes, and a mesh screen, wherein the rear frame portion engages and is securable to the circumferential channel, the method comprising:
(a) placing the mesh screen over a side of the front frame portion with the groove;
(b) positioning the rear frame portion over the mesh screen and the front frame portion and piercing the mesh screen with the spikes such that the spikes extend into the circumferential channel; and
(c) inserting the rear frame portion to fit within and secure to the front frame portion,
wherein the rear frame portion comprises a bump-out section with inside and outside riser surfaces on respective opposite sides thereof, and wherein the spikes extend from the bump-out section, the inside riser surface defining a first pinch surface, the front frame portion comprising a second pinch surface, wherein step (b) is practiced by piercing the mesh screen with the spikes extending from the bump-out section, and wherein step (c) comprises capturing the mesh screen between the first and second pinch surfaces,
wherein the circumferential channel comprises at least one interior groove, and wherein step (c) further comprises extending the plurality of spikes through the mesh screen and toward the circumferential channel such that distal ends of the spikes are disposed in the interior groove.

14. A method according to claim 13, wherein steps (b) and (c) are practiced to capture and tension the mesh screen between the front portion and the rear portion.

* * * * *